(12) United States Patent
Raza et al.

(10) Patent No.: US 11,372,830 B2
(45) Date of Patent: Jun. 28, 2022

(54) INTERACTIVE SPLITTING OF A COLUMN INTO MULTIPLE COLUMNS

(71) Applicant: Microsoft Technology Licensing, LLC, Redmond, WA (US)

(72) Inventors: Mohammad Raza, North Vancouver (CA); Sumit Gulwani, Sammamish, WA (US); Ranvijay Kumar, Sammamish, WA (US); Euan Peter Garden, Bellevue, WA (US); Chairy Chiu Ying Cheung, Redmond, WA (US); Daniel Galen Simmons, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 865 days.

(21) Appl. No.: 15/333,119

(22) Filed: Oct. 24, 2016

(65) Prior Publication Data

US 2018/0113894 A1  Apr. 26, 2018

(51) Int. Cl.
  *G06F 16/00* (2019.01)
  *G06F 16/22* (2019.01)

(52) U.S. Cl.
  CPC ................... *G06F 16/221* (2019.01)

(58) Field of Classification Search
  CPC .................................................. G06F 16/221
  See application file for complete search history.

(56) References Cited

U.S. PATENT DOCUMENTS

| 6,968,395 | B1 | 11/2005 | Lee |
| 7,945,525 | B2 | 5/2011 | Ananthanarayanan et al. |
| 8,271,297 | B2 | 9/2012 | Crooks et al. |
| 8,356,060 | B2 | 1/2013 | Marwah et al. |
| 8,650,207 | B2 | 2/2014 | Gulwani et al. |
| 8,701,032 | B1 | 4/2014 | Zhai et al. |
| 8,793,653 | B2 | 7/2014 | Balasubramanian et al. |
| 8,924,340 | B2 | 12/2014 | Cui et al. |
| 8,972,930 | B2 | 3/2015 | Gulwani |
| 9,002,758 | B2 | 4/2015 | Gulwani et al. |
| 9,400,639 | B2 | 7/2016 | Kalai et al. |
| 9,430,459 | B2 | 8/2016 | Gulwani et al. |
| 2002/0178171 | A1 | 11/2002 | Walker et al. |
| 2003/0167277 | A1 | 9/2003 | Hejlsberg et al. |

(Continued)

OTHER PUBLICATIONS

"Split text into different columns with the Convert Text to Columns Wizard", Retrieved From: https://support.office.com/en-us/article/split-text-into-different-columns-with-the-convert-text-to-columns-wizard-30b14928-5550-41f5-97ca-7a3e9c363ed7, Sep. 16, 2016, 4 Pages.

(Continued)

*Primary Examiner* — Debbie M Le
(74) *Attorney, Agent, or Firm* — Calfee, Halter & Griswold LLP

(57) ABSTRACT

Various technologies described herein pertain to interactive data splitting. A program for splitting an input column of an input data set into multiple output columns can be synthesized based on input-only examples. The program can further be generated based on various user input; thus, the user input can guide the synthesis of the program. Moreover, the program can be executed on the input data set to split the input column of the input data set into the multiple output columns.

20 Claims, 10 Drawing Sheets

(56) References Cited

U.S. PATENT DOCUMENTS

| | | |
|---|---|---|
| 2004/0267732 A1 | 12/2004 | Luk et al. |
| 2006/0004854 A1* | 1/2006 | Okunseinde .............. G06F 16/25 |
| 2007/0078872 A1* | 4/2007 | Cohen ................... G06F 16/338 |
| 2009/0089278 A1 | 4/2009 | Poola et al. |
| 2009/0138503 A1* | 5/2009 | Chowdhury ........ G06F 16/9027 |
| 2009/0327115 A1 | 12/2009 | Schilder et al. |
| 2010/0057733 A1 | 3/2010 | Purisai et al. |
| 2011/0087839 A1* | 4/2011 | Sharma ................... G06F 16/29 711/118 |
| 2012/0254252 A1 | 10/2012 | Jin et al. |
| 2013/0226944 A1 | 8/2013 | Baid et al. |
| 2013/0326475 A1 | 12/2013 | Gulwani et al. |
| 2013/0346982 A1* | 12/2013 | Kalai ......................... G06F 8/30 718/100 |
| 2014/0108418 A1 | 4/2014 | Elbaum et al. |
| 2014/0149841 A1 | 5/2014 | Magar et al. |
| 2014/0280188 A1 | 9/2014 | Seiwald et al. |
| 2014/0324839 A1 | 10/2014 | Sayers et al. |
| 2014/0372857 A1 | 12/2014 | Otero et al. |
| 2015/0254530 A1 | 9/2015 | Gulwani et al. |
| 2015/0324346 A1 | 11/2015 | Sankaran et al. |
| 2016/0154845 A1* | 6/2016 | Jain ...................... G06F 17/2705 |
| 2018/0113890 A1 | 4/2018 | Raza et al. |

OTHER PUBLICATIONS

"Non Final Office Action Issued in U.S. Appl. No. 15/299,071", dated Apr. 8, 2019, 21 Pages.

Gulwani, Sumit, "Programming by Examples", Available at: <<https://www.microsoft.com/en-us/research/wp-content/uploads/2016/06/pbe16.pdf>>, 2016, 22 pages.

Raman, et al., "Potter's Wheel: An Interactive Data Cleaning System", In Proceedings of 27th International Conference on Very Large Data Bases, Sep. 11, 2001, 10 pages.

Gulwani, Sumit, "Automating String Processing in Spreadsheets Using Input-Output Examples", In Proceedings of the 38th annual ACM SIGPLAN-SIGACT symposium on Principles of programming languages, Jan. 26, 2011, pp. 317-329.

Gulwani, et al., "Spreadsheet Data Manipulation Using Examples", In Journal of communications of the acm, vol. 55, No. 8, Aug. 2012, pp. 97-105.

Wu, et al., "An Iterative Approach to Synthesize Data Transformation Programs", In Proceedings of the Twenty-Fourth International Joint Conference on Artificial Intelligence, Jul. 25, 2015, 7 pages.

Gulwani, et al., "StriSynth: Synthesis for Live Programming", In Journal of 37th IEEE/ACM International Conference on Software Engineering, vol. 2, May 16, 2015, 4 pages.

Kandel, et al., "Wrangler: Interactive Visual Specification of Data Transformation Scripts", In Proceedings of the SIGCHI Conference on Human Factors in Computing Systems, May 7, 2011, pp. 3363-3372.

Singh, Rishabh, "BlinkFill: Semi-supervised Programming By Example for Syntactic String Transformations", In Proceedings of the VLDB Endowment, vol. 9, No. 8, May 2016, pp. 1-12.

Fritz, et al., "Towards the Integration of Programming by Demonstration and Programming by Instruction using Golog", In Proceedings of AAAI Workshop: Plan, Activity, and Intent Recognition, Jul. 12, 2010, 7 pages.

Le, et al., "FlashExtract: A Framework for Data Extraction by Examples", In PLDI, Jun. 9, 2014, 12 pages.

Lau, et al., "Programming by Demonstration Using Version Space Algebra", 2011, 60 pages.

Jambor, Sebastian, "Intelligence to Automate Common Data Structuring", TRIFACTA, Jan. 13, 2016, Retrieved At: <<https://www.trifacta.com/blog/intelligence-to-automate-common-data-structuring/>>, 6 pages.

"Final Office Action Issued in U.S. Appl. No. 15/299,071", dated Aug. 18, 2020, 29 Pages.

"Final Office Action Issued in U.S. Appl. No. 15/299,071", dated Dec. 10, 2019, 23 Pages.

"Reply Submitted Concurrently with a Request for Continued Examination", Filed Date: Jan. 15, 2020, 13 Pages.

"Non Final Office Action Issued in U.S. Appl. No. 15/299,071", dated Feb. 6, 2020, 28 Pages.

"Non-Final Office Action Issued in U.S. Appl. No. 15/299,071", dated Apr. 6, 2021, 29 Pages "Final Office Action Issued in U.S. Appl. No. 15/299,071", dated Nov. 16, 2021, 28 Pages.

* cited by examiner

| 191.128.19.55 - - [09/Jun/2016:18:05:33 -0800] "GET /checks.txt HTTP/1.1" 220 617 www.aaa.com/ |
| 174.13.04.3 - - [09/Jun/2016:19:43:23 -0800] "GET /images/pic.png HTTP/1.1" 403 18 - |
| 192.16.201.1 - - [10/Jun/2016:06:10:03 -0800] "GET /pdf/doc.pdf HTTP/1.1" 204 23 http://www.bbb.com/ |
| 11.0.4.50 - - [10/Jun/2016:16:10:02 -0800] "GET /index.html HTTP/1.1" 234 74 http://ccc.com |
| 191.169.12.13 - - [11/Jun/2016:11:10:02 -0800] "GET /index.html HTTP/1.1" 505 75 www.ddd.com/ |
| 172.18.0.102 - - [11/Jun/2016:16:12:34 -0800] "GET /logs/access.log HTTP/1.1" 234 32 https://gg.com/ |
| 192.19.2.100 - - [11/Jun/2016:17:32:36 -0800] "GET /index.html HTTP/1.1" 500 15 - |
| 10.129.2.78 - - [11/Jun/2016:17:45:38 -0800] "GET /data/2/4 HTTP/1.1" 130 933 - |
| 171.19.3.12 - - [11/Jun/2016:22:12:01 -0800] "GET /data/ HTTP/1.1" 254 5 https://x.com/us |
| 191.168.125.11 - - [11/Jun/2016:23:12:52 -0800] "GET /pics/pic2.png HTTP/1.1" 304 502 http://u.net |

```
204
```

| | | | | | | | | | | | | | |
|---|---|---|---|---|---|---|---|---|---|---|---|---|---|
| 191.128.19.55 | - - [ | 09/Jun/2016 | : | 18:05:33 | -0800] | " | GET | / | checks.txt | HTTP | / | 1.1 " | 220 | 617 | www.aaa.com/ |
| 174.13.04.3 | - - [ | 09/Jun/2016 | : | 19:43:23 | -0800] | " | GET | / | images/pic.png | HTTP | / | 1.1 " | 403 | 18 | - |
| 192.16.201.1 | - - [ | 10/Jun/2016 | : | 06:10:03 | -0800] | " | GET | / | pdf/doc.pdf | HTTP | / | 1.1 " | 204 | 23 | http://bbb.com |
| 11.0.4.50 | - - [ | 10/Jun/2016 | : | 16:10:02 | -0800] | " | GET | / | index.html | HTTP | / | 1.1 " | 234 | 74 | http://ccc.com |
| 191.169.12.13 | - - [ | 11/Jun/2016 | : | 11:10:02 | -0800] | " | GET | / | index.html | HTTP | / | 1.1 " | 505 | 75 | www.ddd.com/ |
| 172.18.0.102 | - - [ | 11/Jun/2016 | : | 16:12:34 | -0800] | " | GET | / | logs/access.log | HTTP | / | 1.1 " | 234 | 32 | https://gg.com/ |
| 192.19.2.100 | - - [ | 11/Jun/2016 | : | 17:32:36 | -0800] | " | GET | / | index.html | HTTP | / | 1.1 " | 500 | 15 | - |
| 10.129.2.78 | - - [ | 11/Jun/2016 | : | 17:45:38 | -0800] | " | GET | / | data/2/4 | HTTP | / | 1.1 " | 130 | 933 | - |
| 171.19.3.12 | - - [ | 11/Jun/2016 | : | 22:12:01 | -0800] | " | GET | / | data/ | HTTP | / | 1.1 " | 254 | 5 | https://x.com/us |
| 191.168.125.11 | - - [ | 11/Jun/2016 | : | 23:12:52 | -0800] | " | GET | / | pics/pic2.png | HTTP | / | 1.1 " | 304 | 502 | http://u.net |

206, 208, 210, 212, 214, 216, 218, 220, 222, 224, 226, 228, 230, 232, 234, 236, 238, 240, 242, 244, 246

INTERACTIVE SPLITTING OF A COLUMN INTO MULTIPLE COLUMNS

BACKGROUND

The information technology revolution over the past few decades has resulted in various advances. Examples of such advances include digitization of massive amounts of data and widespread access to computing devices. Moreover, it has become increasingly desirable to obtain insights from the continuously expanding volume of data. Yet, since data may be generated by differing data sources, data from the differing sources can be in a multitude of different formats.

A common challenge is dealing with the data in the different formats. Accordingly, it may be desired to bring the raw data into a form that is amenable to various analysis tools. The process of converting or mapping the raw data to another format that allows for more convenient consumption can be referred to as data cleaning or data wrangling. For instance, as part of data cleaning or data wrangling, the data can be normalized, validated, enriched, and published in an appropriate format for a particular application (e.g., for data visualization, data aggregation, training a statistical model, or otherwise obtaining insights from the data). However, pre-processing data as part of data cleaning or data wrangling can be a time-consuming activity and typically relies on programming skills of an individual in order to write robust extraction or transformation scripts.

For example, a data set to be pre-processed can include a list of entries that have been serialized. Following this example, various fields in each entry can be merged together into a single string, with delimiters between the fields in each of the entries. In order to operate over the data for further processing, the entries may need to be split into constituent fields as part of data cleaning or data wrangling. However, the delimiters used and the number of delimiters can differ across the various entries in the input list. Moreover, a character may be used as a delimiting character in some places in the entries of the data set, while such character is not used as a delimiting character in other places in the entries of the data set. Accordingly, traditional tools that can split a file into columns (e.g., file parsers for comma-separated values (CSV) files) that rely on use of standardized format encodings can be unable to handle splitting the entries of a data set having arbitrary and/or varying formats.

Moreover, with the ever-increasing growth in the amount of data, there have been various attempts to use automatic programming techniques to address the problem of data cleaning or data wrangling. Many of these conventional techniques utilize programming-by-example (PBE) approaches. In PBE, a user can specify an intended task by giving input-output examples, from which a PBE system attempts to automatically generate a program in a domain-specific language (DSL) that satisfies the given examples. Conventional PBE techniques commonly use two or three input-output examples per field to be extracted; thus, as a number of fields to be extracted increases, the amount of manual effort on the part of the user likewise increases to provide the input-output examples for performing an extraction task (e.g., 100-150 input-output examples may be provided by the user to extract 50 fields from a data set). Moreover, the user may be unaware of the examples that would be most useful to infer the correct program, and instead, the user may supply the input-output examples from the top few rows of the data set; accordingly, the learned program may be over-specific to the given examples, while failing for later rows in the data set.

SUMMARY

Described herein are various technologies that pertain to interactive data splitting. A program for splitting an input column of an input data set into multiple output columns can be synthesized based on input-only examples. The input-only examples can include example text string entries from the input column of the input data set without specification of how the example text string entries are to be split into the multiple output columns. The program can further be generated based on various user input; thus, the user input can guide the synthesis of the program. Moreover, the program can be executed on the input data set to split the input column of the input data set into the multiple output columns.

According to various embodiments, a first program for splitting the input column of the input data set into the multiple output columns can be synthesized from input-only example. The first program can be executed to output a first split of the input column of the input data set into the multiple output columns. Moreover, user input that refines the first split of the input column of the input data set into the multiple output columns can be received. Responsive to receiving the user input, a second program for splitting the input column of the input data set into the multiple output columns can be synthesized based on the user input. Further, the second program can be executed to output a refined, second split of the input column of the input data set into the multiple output columns.

Pursuant to various embodiments, a program for splitting the input column of the input data set into the multiple output columns can be synthesized in a domain-specific language (DSL) from input-only examples. The DSL can be for splitting a text string into a tuple of fields based on a combination of delimiters. Moreover, the program can be caused to be displayed on a display screen. When displayed on the display screen, the program can be editable. The program can be updated based on user input that specifies an edit to the program displayed on the display screen. Further, the program as updated can be executed on the input data set to output a split of the input column of the input data set into the multiple output columns.

In accordance with various embodiments, a prompt can be caused to be displayed on a display screen, where the prompt specifies an ambiguity regarding splitting the input column of the input data set into the multiple output columns. The prompt, for instance, can be a question for a user that asks for clarifying information at a place of ambiguity. Responsive to the prompt, user input that clarifies the ambiguity can be received. Further, a program for splitting the input column of the input data set into the multiple output columns can be synthesized based on the user input, and such program can be executed on the input data set to output a split of the input column of the input data set into the multiple output columns.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 2 illustrates an exemplary text splitting scenario.

DETAILED DESCRIPTION

Figure 1:
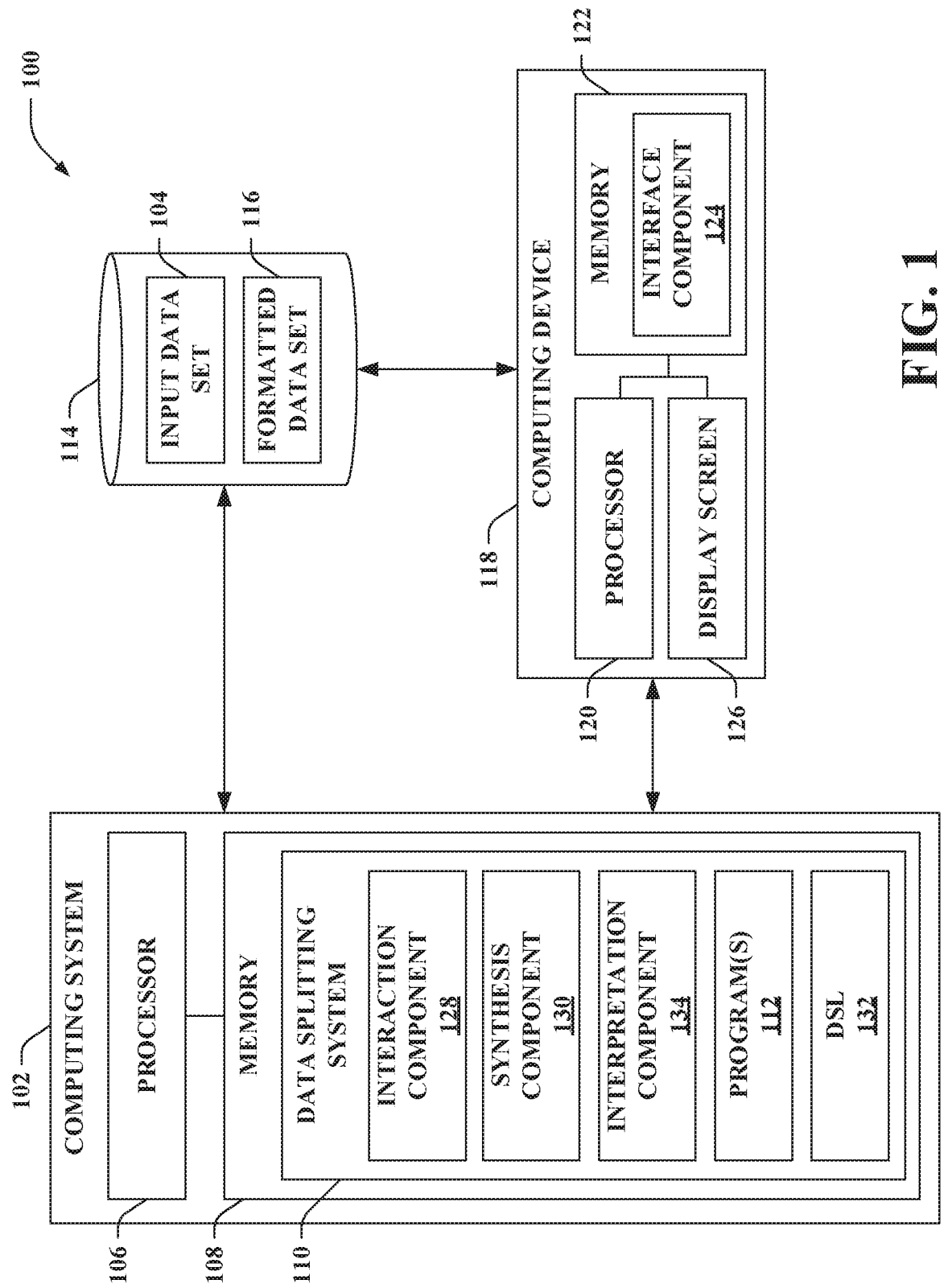
FIG. 1 illustrates a functional block diagram of an exemplary system that performs interactive data splitting.

Various technologies pertaining to synthesizing and executing a program for interactively splitting an input column of an input data set into multiple output columns are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Referring now to the drawings, FIG. 1 illustrates a system 100 that performs interactive data splitting. The system 100 includes a computing system 102 that is configured to perform data splitting on an input data set 104. The computing system 102 includes at least one processor 106 and memory 108. The processor 106 is configured to execute instructions loaded into the memory 108 (e.g., one or more systems loaded into the memory 108, one or more components loaded into the memory 108). As described in greater detail herein, the memory 108 includes a data splitting system 110 executable by the processor 106. The data splitting system 110 is configured to control synthesis and execution of a program (or programs) 112 for splitting an input column of the input data set 104 into multiple output columns.

The system 100 can include a data repository 114 that is accessible to the computing system 102. While shown as being separate from the computing system 102, it is to be understood that the data repository 114 may be included in the computing system 102. The data repository 114 stores the input data set 104. For instance, data included in the input data set 104 can be received from a plurality of different data sources. These data sources may include any suitable data sources, such as computer-executable applications, webpages, log files, sensors, etc. Moreover, the data outputted by the data sources can have different formats; accordingly, the input data set 104 can include data having various formats.

Pursuant to various examples, the computing system 102 can be a computing device. Substantially any type of computing device is intended to fall within the scope of the hereto appended claims. Examples of such computing device include a desktop computing device, a mobile computing device (e.g., a mobile telephone such as a smart phone, a laptop computing device, a tablet computing device, a wearable computing device, a handheld computing device, a portable gaming device, a personal digital assistant), an automotive computer, a gaming console, a set top box, a television, an embedded computing device, or the like.

According to other examples, the computing system 102 can be or include one or more server computing devices. For instance, the computing system 102 can be or include one or more data centers, where a data center includes a plurality of server computing devices. One or more data centers can alternatively include the computing system 102. Further, the computing system 102 can be a distributed computing system.

The data splitting system 110 can split an input column of the input data set 104 into multiple output columns. Accordingly, the data splitting system 110 can output a formatted data set 116, which can be stored in the data repository 114. While the data repository 114 is depicted as including both the input data set 104 and the formatted data set 116, it is to be appreciated that the formatted data set 116 can replace the input data set 104 (or a portion of the formatted data set 116 can replace a portion of the input data set 104) responsive to the data splitting system 110 performing the splitting of the input column. According to another example, the input data set 104 and the formatted data set 116 can represent a common data set at different times, with the input data set 104 representing the common data set prior to splitting and the formatted data set 116 representing the common data set subsequent to splitting.

The system 100 can further include a computing device 118 that includes at least one processor 120 and memory 122 that stores instructions that are executed by the processor 120. The memory 122 can have an interface component 124 loaded therein, wherein the interface component 124 is configured to generate various user interfaces for presenting information to a user of the computing device 118 and/or obtaining user input from the user of the computing device 118. The computing device 118 can also include (or otherwise be coupled with) a display screen 126. Moreover, the computing device 118 can be communicatively coupled with the computing system 102 and/or the data repository 114 (e.g., by way of network connection(s)).

The interface component 124, for instance, can present a visualization of a data set (e.g., the input data set 104, the formatted data set 116), or a portion of a data set, on the display screen 126. Additionally or alternatively, the interface component 124 can obtain user input to interactively guide synthesis of the program(s) 112 for splitting the input column of the input data set 104 into multiple output columns. The user input obtained by the interface component 124 can be transmitted from the computing device 118 to the computing system 102. The data splitting system 110 can receive the user input from the computing device 118, which can be used to interactively control splitting of the input column into the multiple columns.

The data splitting system 110 can split the input column of entries from the input data set 104 into multiple columns in the formatted data set 116. As described herein, each entry in the input column of the input data set 104 can be a text string entry. A collection of entries (e.g., text strings) can be analyzed by the data splitting system 110 to identify an underlying pattern amongst those entries. The pattern can identify what is similar and what is variable amongst those entries. Accordingly, the data splitting system 110 can generate a program (e.g., one or more of the program(s) 112), which can transform an entry into an n-tuple of strings for a fixed n based on the discovered pattern (where n is a positive integer). Further, the program can be interactively generated by the data splitting system 110 using the received user input (e.g., received from the computing device 118), which can include specifying a value of n that is different from the one inferred by the splitting program.

The data splitting system 110 includes an interaction component 128 configured to receive the user input from the computing device 118. The interaction component 128 can also be configured to cause information to be displayed by the interface component 124 on the display screen 126 of the computing device 118. By way of example, the interaction component 128 can cause a program (e.g., one or more of the program(s) 112) to be displayed on the display screen 126; the program may be editable when displayed on the display screen 126 of the computing device 118. Pursuant to another example, the interaction component 128 can cause a prompt to be displayed on the display screen 126; following this example, the prompt can be used to solicit the user input, where the user input can be used to interactively control splitting the input column of the input data set 104. The user input, for instance, can be used by the data splitting system 110 as part of synthesizing a program and/or for a post synthesis operation. The interactive techniques for splitting the input column of the input data set 104 described herein can be beneficial both to speed up the data cleaning or data wrangling process and to make such process accessible to a wide range of data analysts and knowledge workers regardless of programming skills.

The data splitting system 110 can also include a synthesis component 130 configured to synthesize the program(s) 112 (or a subset thereof) for splitting the input column of the input data set 104 into the multiple output columns. According to an example, the synthesis component 130 can synthesize a program (e.g., one or more of the program(s) 112) for splitting the input column of the input data set 104 into the multiple output columns based on input-only examples. The input-only examples include example text string entries from the input column of the input data set 104 to be split into multiple output columns without specification of how the example entries are to be split into multiple output columns. The synthesis component 130 can synthesize the program utilizing a predictive program synthesis algorithm, for instance. Moreover, the synthesis component 130 can synthesize the program in a domain-specific language (DSL) 132 for splitting an entry (e.g., a text string) into a tuple of fields based on a combination of delimiters. The program(s) 112 can be structured as a combination of independent field-level programs (also referred to herein as sub-programs) in the DSL 132 for different fields in the input data set 104.

The DSL 132 is designed to balance a trade-off between expressivity and tractability. Thus, the DSL 132 can be expressive enough to address a range of practical use cases (e.g., the DSL 132 can be used to synthesize programs for input data sets having a wide variety of custom formats). The DSL 132 can also be restrictive enough to facilitate efficiently generating correct programs (e.g., the DSL 132 can support efficient searching and ranking among possible sub-programs).

The data splitting system 110 can further include an interpretation component 134 configured to execute the program(s) 112 on the input data set 104 to split the input column of the input data set 104 into the multiple output columns. According to an example, subsequent to a program being synthesized by the synthesis component 130 (e.g., based on the input-only examples), the program can be executed by the interpretation component 134 on a larger set of data (e.g., the input data set 104). Further, the interpretation component 134 can generate the formatted data set 116. The input column of the input data set 104 can be split into the multiple output columns such that, responsive to execution of the program by the interpretation component 134 on the input data set 104, each entry from the input column of the input data set 104 can be separated into a tuple of fields. Moreover, the fields can be assigned to the multiple output columns. Since splitting is performed, each field of an entry is assigned to a corresponding output column (as opposed to extraction which need not include all portions of an input entry in an output). It is also contemplated that the program(s) 112 can be stored and subsequently applied by the interpretation component 134 to data set(s) similar to the input data set 104.

The program(s) 112 can split an entry (e.g., text string) from the input column of the input data set 104 into a tuple of fields (e.g., tuple of substrings) based on a combination of delimiters. Various types of delimiters are intended to fall within the scope of the hereto appended claims. For example, a delimiter in the text string can be an occurrence of a constant string in the text string (e.g., an exact match to the constant string or a match to the constant string that includes surrounding whitespace). According to another example, a delimiter in the text string can be a contextual delimiter. A contextual delimiter can be an occurrence of a constant string between a first regular expression match and a second regular expression match in the text string; thus, it is contemplated that a differing occurrence of the constant string that is not between the first regular expression match and the second regular expression match in the text string is not specified as a delimiter. Moreover, in some instances, either the first regular expression or the second regular expression can be empty. Pursuant to a further example, a delimiter in the text string can be a zero length delimiter. A zero length delimiter can be an empty string that specifies a boundary between two adjacent fields in the text string. A zero length delimiter is a special case of a contextual delimiter where the constant string is the empty string. A zero length delimiter can also include two regular expressions that match, or constrain, a prefix and a suffix of the two adjacent fields.

Now turning to FIG. 2, illustrated is an exemplary text splitting scenario. In the example shown in FIG. 2, an input data set 202 (e.g., the input data set 104) includes entries from a web server log. The input data set 202 is depicted as including one input column, with a plurality of rows in the input column. While one column and ten rows are shown in the input data set 202 of FIG. 2, it is contemplated that substantially any number of columns and rows can be included in the input data set 202. Moreover, each row (e.g., each entry) in the input column of the input data set 202 can include a text string having values such as IP address, date, etc., which are separated by various delimiting regions that are particular to a format of this log.

The data splitting system 110 described herein can split the values in the text strings into separate columns; thus, the data splitting system 110 can output a formatted data set 204 (e.g., the formatted data set 116) as illustrated in FIG. 2, where multiple columns can be formed from the input column of the input data set 202. In the example shown in FIG. 2, the input column of the input data set 202 can be split into columns 206-246 in the formatted data set 204. The columns 206, 210, 214, 218, 222, 226, 230, 234, 238, 242, and 246 include differing fields from the text strings of the input data set 202 (e.g., the column 206 includes IP addresses, the column 210 includes dates, the column 214 includes times). Moreover, the columns 208, 212, 216, 220, 224, 228, 232, 236, 240, and 244 include delimiters.

For a data set having a simple text-based format, such as a comma-separated values (CSV) format, a fixed, single character delimiter is typically used to separate data values in a string. For instance, the ";" character may be used to separate each value in such a data set. Accordingly, a traditional file parser may be used to split the data set at instances of the ";" character. Yet, a traditional file parser would be unable to perform the splitting described herein. More particularly, as shown in FIG. 2, there can be any number of arbitrary string delimiters used in the input data set 202, and a particular string may be used as a delimiter in some places but not in other locations in the input data set 202. For example, in FIG. 2, the "I" character is a delimiter separating the HTTP protocol version (in column 232), but the "I" character does not act as a delimiter inside the URLs in column 246. Hence, it is not possible to simply split the input data set 202 by all occurrences of a particular string.

Figure 3:
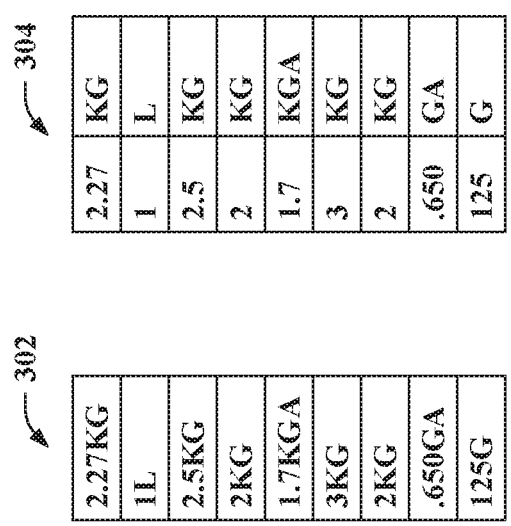
FIG. 3 illustrates another exemplary text splitting scenario, where strings to be split include a zero length delimiter.

Now turning to FIG. 3, illustrated is another exemplary text splitting scenario, where strings to be split include a zero length delimiter. An input column 302 and output columns 304 are depicted in FIG. 3. In various cases, there may actually be no delimiting string between two data values in a string to be split. For example, FIG. 3 shows a splitting task that can be performed by the data splitting system 110, where there are no delimiting characters. As depicted in the input column 302 of the input data set, numerical values and units of measure are adjacent to each other without a space there between; accordingly, there are no delimiting characters in the input column 302 between the numerical values and the units of measure. In this case, the data splitting system 110 can identify a zero length delimiting region, which can be a single point in a string defined by a context of having a number on the left side of the point and a letter on the right side of the point. Accordingly, the output columns 304 of the formatted data set can be outputted by execution of a program that splits the numerical values from the letters representing the units of measure.

Reference is again made to FIG. 1. As noted above, the synthesis component 130 can synthesize a program (e.g., one of the program(s) 112) for splitting the input column of the input data set into multiple output columns. The program can be synthesized based on input-only examples from the input column of the input data set (e.g., on the order of a few hundred or a thousand input-only examples sampled from the input column). Moreover, the interpretation component 134 can execute the program to output a split of the input column of the input data set 104 into the multiple output columns. According to an example, the interaction component 128 can receive user input from the computing device 118 (e.g., obtained from a user via the interface component 124), where the user input causes the synthesis and execution of the program. Following this example, the user input can generally select the input data set 104 for splitting. Alternatively, it is contemplated that the user input can specify that the input column of the input data set 104 in particular desirably be split. Yet, pursuant to other examples, the program can be automatically synthesized and executed (e.g., responsive to the input data set 104 reaching a predefined size, after a predetermined duration of time, responsive to the input data set 104 being accessed, responsive to initiating data cleaning or data wrangling of the input data set 104). However, in some cases, the program synthesized by the synthesis component 130 based on input-only examples may be incorrect (e.g., results of execution of the program may diverge from desired results, ambiguities regarding how to split the input column of the input data set 104 may exist). Accordingly, the interaction component 128 can support various techniques to allow for interactively guiding the synthesis component 130 to synthesize a correct program for splitting the input column of the input data set 104 into the multiple columns (e.g., to have the results of the execution of the program converge to the desired results, to resolve ambiguities regarding how to split the input column). Moreover, the interactive techniques supported by the interaction component 128 can enhance efficiency of obtaining the correct program (e.g., reduce a number of processor cycles for generating the program, reduce a length of time needed to generate the program). The interactive techniques can also enhance a user experience when splitting the input column of the input data set 104 into the multiple columns.

According to an exemplary scenario, the synthesis component 130 can synthesize a first program (e.g., one of the program(s) 112) for splitting the input column of the input data set 104 into the multiple output columns, and the interpretation component 134 can execute the first program to output a first split of the input column of the input data set 104 into the multiple output columns. The first program may be automatically synthesized by the synthesis component 130 based on input-only examples without specification of how example text string entries of the input-only examples are to be split into the multiple output columns. However, it is to be appreciated that other interactive techniques described herein can be used to enable the first program to be synthesized. Moreover, the interaction component 128 can receive user input that refines the first split of the input column of the input data set 104 into the multiple output columns. For instance, the user input can be received from the computing device 118 (e.g., the interface component 124 can obtain the user input from a user of the computing device 118). Responsive to the interaction component 128 receiving the user input, the synthesis component 130 can synthesize a second program (e.g., one of the program(s) 112) for splitting the input column of the input data set 104 into the multiple output columns based on the user input. Additionally, the interpretation component 134 can execute the second program to output a refined, second split of the input column of the input data set into the multiple output columns. Continuing reference is made to this exemplary scenario below.

The user input received by the interaction component 128 can specify a constraint for refining the first split of the input column of the input data set 104 into the multiple output columns. For instance, the user input can include declarative constraint(s) and/or example-based constraint(s) (e.g., a constraint can be a declarative constraint and/or an example-based constraint).

A declarative constraint indicates a property for a program across all text string entries of the input data set 104. Thus, in the foregoing exemplary scenario, a declarative constraint can indicate a property for the second program. Examples of a declarative constraint include a number of output columns, a column type of a particular output column, a set of delimiters, and quote/escape characters. By way of illustration, the interaction component 128 can receive user input from the computing device 118 specifying column types(s), where the user input specifies that a third output column is a date column, a fifth output column is a currency column, and so forth. Following this illustration, it is to be appreciated that a column type need not be specified in the user input for each of the output columns. Further, a set of delimiters that can be indicated as part of a declarative constraint can be a subset of delimiters, a superset of delimiters, or an exact-set of delimiters for the program (e.g., for the second program to be synthesized in the above exemplary scenario). The declarative constraints that relate to the number of output columns to result from execution of the program or kinds of delimiters included in a program (e.g., the set of delimiters) can be used by the interaction component 128 to refine the DSL 132 (e.g., as a pre-synthesis operation, prior to the second program being synthesized in the above exemplary scenario). Moreover, the declarative constraints that relate to the output column types can be used by the interaction component 128 as part of post-synthesis filtering.

An example-based constraint indicates a property for a particular text string entry in the input data set 104. An example-based constraint can be an inductive constraint. According to an illustration, an example-based constraint can specify a property for a sixth text string entry in the input data set 104 (e.g., a sixth row of the input data set 104). An example-based constraint can specify a substring in the particular text string entry indicated in the user input as being an instance of a delimiter in between two successive specified output columns and/or a substring in the particular text string entry indicated in the user input as being an instance of a field for a specified output column. Thus, the user can provide one or more examples of one or more fields and/or one or more delimiters in a record of the input data set 104 (as opposed to all fields or all delimiters in the record). It is contemplated that the user may indicate a substring as being some field instance, without indicating the field to which it corresponds. Alternatively, the user may indicate a substring as being a specific field instance (e.g., the substring is an instance of the field assigned to the seventh output column). Moreover, the user may provide negative examples (e.g., when the first split outputted by executing the first program does not match the user's intent in the foregoing exemplary scenario). Thus, an example-based constraint can include negative feedback (for the first program), where the negative feedback specifies a substring in the particular text string entry indicated in the user input as not being an instance of a delimiter and/or a substring in the particular text string entry indicated in the user input as not being an instance of a field in some particular output column. It is contemplated that the positive example-based constraints can be used by the synthesis component 130 during synthesis (e.g., to enhance searching performed by the synthesis component 130). Moreover, the negative example-based constraints can be used by the interaction component 128 as part of post-synthesis filtering.

According to another example, the interface component 124 can obtain user input that iteratively refines a program (e.g., the first program) by specifying a particular output column to be further split and/or specifying a contiguous subsequence of the multiple output columns to be merged. Thus, a user can guide the process using a sequence of steps, where the user can indicate that more fine-grained splitting of a particular output column be provided and/or a contiguous subsequence of the multiple output columns produced by a previously executed program be merged. For instance, referring to the above exemplary scenario, the interaction component 128 can cause a result of the first program to be displayed on the display screen 126 of the computing device 118 by the interface component 124. The user can select a particular output column having dates in a format such as "Month Day, Year", and can choose to further split this output column. Thus, the user input received by the interaction component 128 can specify the particular output column to be further split. Responsive to receiving such user input, the synthesis component 130 can synthesize the second program based on the user input. Further, the interpretation component 134 can execute the second program to output the refined, second split of the input column of the input data set 104. The interaction component 128 can cause a result of the second program to be displayed on the display screen 126 of the computing device 118 (e.g., with separate output columns for "Month" "Day" and "Year").

According to another exemplary scenario, the interaction component 128 can cause a prompt to be displayed on the display screen 126 of the computing device 118. The prompt can specify an ambiguity regarding splitting an input column of the input data set 104 into the multiple output columns. The prompt, for instance, can be a question for the user that asks for clarifying information at a place of ambiguity. The prompt can solicit user input to clarify the ambiguity. The interaction component 128 can further receive user input that clarifies the ambiguity (e.g., the user input can be obtained by the interface component 124 and sent from the computing device 118 to the computing system 102). Further, the synthesis component 130 can synthesize a program for splitting the input column of the input data set 104 into the multiple output columns based on the user input. Moreover, the interpretation component 134 can execute the program on the input data set 104 to output a split of the input column of the input data set 104 into the multiple output columns.

The prompt (e.g., the question) can correspond to various kinds of constraints. Thus, the user input received responsive to the prompt can specify a declarative constraint and/or an example-based constraint, as described herein. Various examples of prompts include "How should row two be split?", "How many output columns should the data set be split into?", "Should the date be split into separate output columns?".

Pursuant to an example, the interaction component 128 can generate the prompt based on distinguishing inputs (e.g., based on differences in execution of different top-ranked synthesized programs); following this example, the prompt can be generated as part of a post synthesis operation. According to another example, the interaction component 128 can generate the prompt based on a number of choice points encountered by the synthesis component 130 (e.g., if the synthesis component 130 has more than a threshold number of choice points to explore in an underlying search space of programs during synthesis).

Pursuant to yet another exemplary scenario, the synthesis component 130 can synthesize a program (e.g., one of the program(s) 112) for splitting the input column of the input data set into the multiple output columns. Again, the program can be synthesized in the DSL 132. The interaction component 128 can cause the program to be displayed on the display screen 126 of the computing device 118. When displayed on the display screen 126, the program can be editable via the interface component 124. The interaction component 128 can further update the program based on user input (e.g., received via the interface component 124 from the computing device 118). The user input can specify an edit to the program displayed on the display screen 126. The interpretation component 134 can further execute the program as updated on the input data set 104 to output a split of the input column of the input data set 104 into the multiple output columns.

Following this exemplary scenario, it is contemplated that prior to the above-described updating of the program, the interpretation component 134 can execute the program on the input data set 104. Further, prior to such updating of the program, the interaction component 128 can cause a result of the program prior to the updating to be displayed on the display screen 126 of the computing device 118 along with the program.

In accordance with yet another exemplary scenario, the interaction component 128 can receive user input from the computing device 118 prior to a program being synthesized. Again, the user input can specify a constraint (e.g., a declarative constraint, an example-based constraint). Responsive to receiving the user input, the synthesis component 130 can synthesize a program for splitting the input column of the input data set 104 into the multiple output columns based on the user input (as well as input-only examples from the input data set 104). The interpretation component 134 can further execute the program to output a split of the input column of the input data set 104 into the multiple output columns.

It is further contemplated that more than one of the foregoing exemplary scenarios can be implemented in combination.

Figure 4:
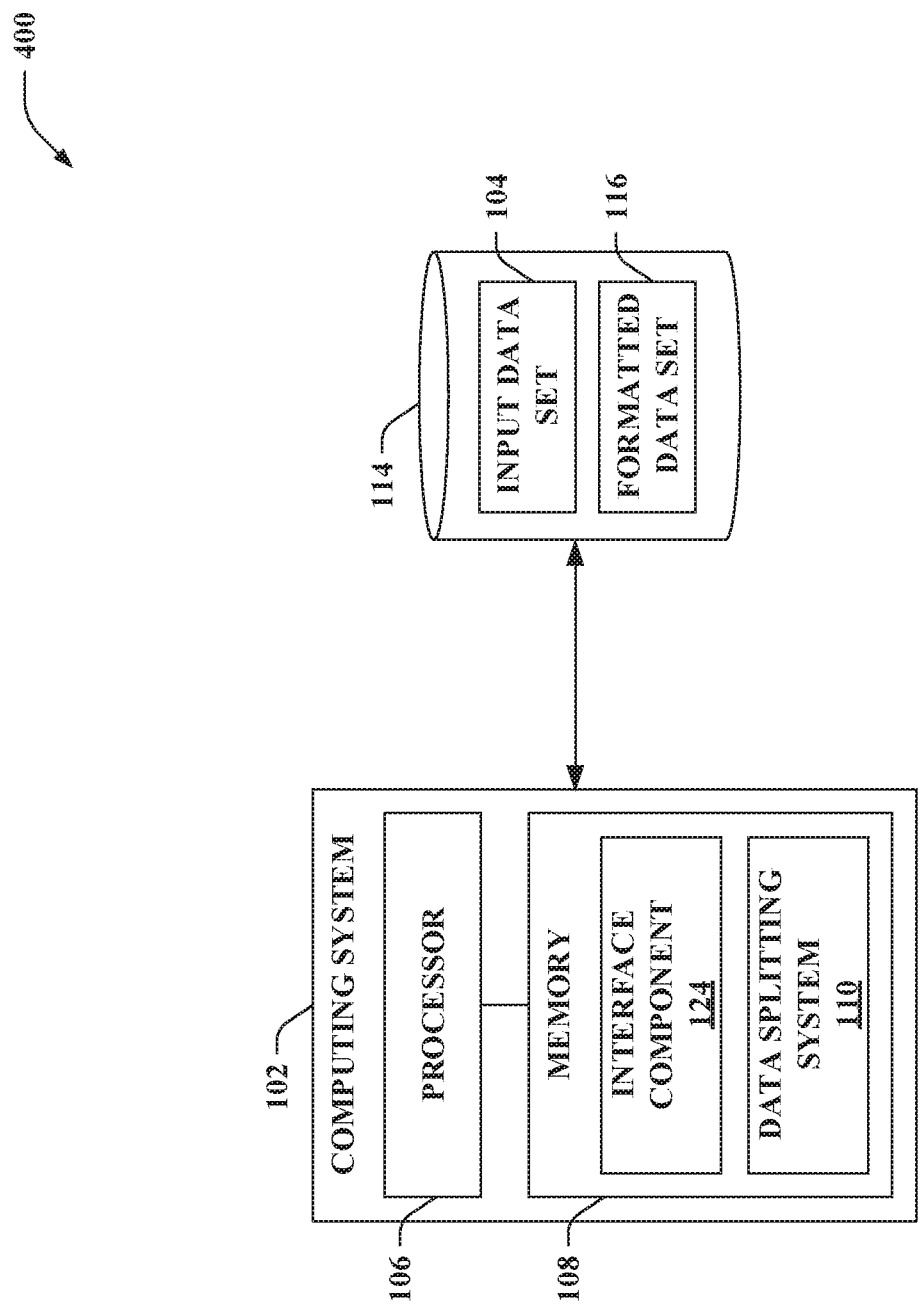
FIG. 4 illustrates a functional block diagram of another exemplary system that employs interactive splitting of an input column of an input data set.

Turning to FIG. 4, illustrated is another system 400 that employs interactive splitting of an input column of the input data set 104. The system 400 again includes the computing system 102 and the data repository 114. In the example shown in FIG. 4, the memory 108 of the computing system 102 can have the interface component 124 loaded therein along with the data splitting system 110. Thus, a user may interact with the computing system 102 to provide user input as described herein. Although not shown, it is contemplated that the computing system 102 can include, or be coupled to, a display screen (e.g., the display screen 126.

Figure 5:
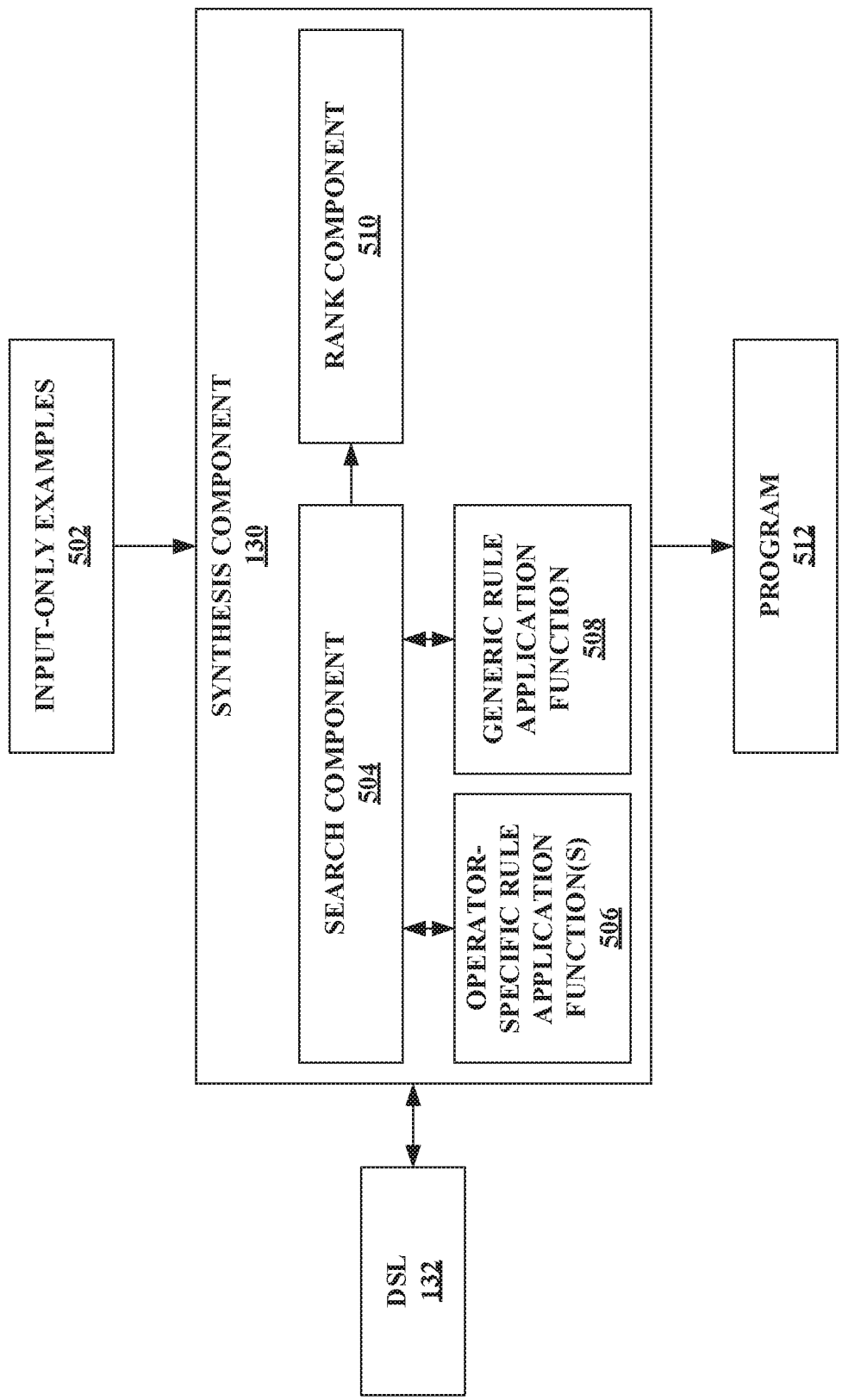
FIG. 5 illustrates a functional block diagram of an exemplary synthesis component of a data splitting system.

Now turning to FIG. 5, illustrated is an example of the synthesis component 130 of the data splitting system 110 in greater detail. An example of the DSL 132 is also discussed below. Yet, it is contemplated that other DSLs and/or other synthesis algorithms may fall within the scope of the hereto appended claims.

The DSL 132 can be defined as a context-free grammar of the form of $(\bar{\psi}_N, \bar{\psi}_T, \psi_{start}, R)$, where $\bar{\psi}_N$ is a set of non-terminal symbols, $\bar{\psi}_T$ is the set of terminal symbols, $\psi_{start}$ is a start symbol, and R is a set of non-terminal production rules of the grammar. A terminal symbol is a literal symbol that may appear in the outputs of a production rule of the grammar and which cannot be changed using the rules of the grammar, and a non-terminal symbol is a symbol that can be replaced. Further, the non-terminal production rules can specify which symbols may replace other symbols.

Every symbol $\psi$ can be semantically interpreted as ranging over a set of values $[[\psi]]$, which can be standard types, such as integers, strings, arrays, etc. Each production rule $r \in R$ can represent an operator in the programming language, and can be of the form $\psi_h := O_p(\psi_1, \ldots, \psi_n)$, where $O_p$ is the name of the operator. An operator can take parameter types given by body symbols $\psi_i \in \bar{\psi}_N \cup \bar{\psi}_T$ and can return a value of a type given by a head symbol $\psi_h \in \bar{\psi}_N$. Thus, the formal semantics of the DSL 132 can be given by an interpretation of each rule r as a function:

$$[[r]]:[[\psi_1]] \times \ldots \times [[\psi_n]] \rightarrow [[\psi_h]]$$

In the foregoing, $\psi_h$ is the head symbol and $\psi_1, \ldots, \psi_n$ are the body symbols of the rule operator. A program P of type $\psi$ can be any concrete syntax tree defined by the DSL grammar with root symbol $\psi$. A complete program has the root symbol $\psi_{start}$. A derivation from a non-root symbol can be a sub-program.

Structural constraints that support the data splitting task can be imposed on the DSL 132. A first structural constraint is that a global variable available to the semantics of operators can exist in the programming language. The global variable can hold the input data set 104 on which the splitting task is being performed. The input variable can have a fixed type, such as a text string. Another structural constraint is that there can be a unique top-level rule in the DSL 132 that has the start symbol as the head symbol. The top-level rule can be of the form $\psi_{start} := O_{p_t}(\psi_f, \ldots, \psi_f)$ for some $O_{p_t}$ and $\psi_f$. The top-level rule models a splitting task as a program that includes a top-level operator $O_{p_t}$, where the top-level operator combines the results of different field-level programs $\psi_f$ that work at the level of individual fields in the input data. For example, for text splitting, the field-level programs can identify the logic for detecting particular delimiters between data values, while the top-level operator can combine these different delimiters to produce the list of extracted values.

An example of the DSL 132 (also referred to herein as DSL $L_t$) for text splitting is shown below.

@startstring[ ]spl:=SplitByDelimiters(d, . . . ,d)
   Pair<int, int>[ ]d:=c|LookAround(r,c,r)
   Pair<int, int>[ ]c:=StrMatch(s)|StrMatchWs(s)
   Pair<int, int>[ ]r:=Empty( )|TokMatch(t)|Concat(r, r)
@inputstring string s RegexToken t The DSL 132 can be based on delimiters and regular expressions for detecting splitting patterns. The symbols of the grammar are shown with their associated semantic types, and the start and terminal symbols can be explicitly marked. The input is a text string that includes values, possibly separated by delimiting regions, and the output (e.g., start symbol) of a program is an array of the extracted substrings. The top-level operator for the DSL 132 is the SplitByDelimiters function, which uses a number of different delimiter programs (e.g., field-level programs) to produce a final splitting of the input string. Each delimiter program can compute a sequence of delimiting regions represented as a pair of start and end positions in the input string. A delimiter program can be a match of a constant string (e.g., exact matches with StrMatch or matches including surrounding whitespace with StrMatchWs) or a contextual delimiter LookAround($r_1$, c, $r_2$) that matches occurrences of a constant string when it occurs between a first regular expression match $r_1$ and a second regular expression match $r_2$. For example, a program that splits by occurrences of ";" and occurrences of "," including the surrounding whitespace can be given as SplitByDelimiters(StrMatch(";"), StrMatchWs (",")). Following this example, on the input string "a; b, c;d, e; f", this exemplary program can produce the output ["a", ";", "b", ",", "c", ";", "d", ",", "e", ";", "f"]. Moreover, as described above in connection with FIG. 3, a contextual delimiter with an empty string can address zero length delimiter scenarios, where a desired splitting task can be accomplished with the following delimiter program that detects the boundaries between numbers and letters: LookAround(TokMatch([0-9]), " ", TokMatch([A-Za-z])).

An example of the synthesis component 130 is now described in greater detail; yet, it is contemplated that the claimed subject matter is not so limited. Again, the synthesis component 130 can be configured to synthesize a program 512 for splitting an input column of an input data set (e.g., the input data set 104) into multiple output columns based on input-only examples 502. The synthesis component 130 can employ predictive program synthesis algorithm to generate the program 512 from the input-only examples 502. Although not shown, it is to be appreciated that the user input obtained by the interaction component 128 can further be employed by the synthesis component 130 to generate the program 512.

The synthesis component 130 can include a search component 504 configured to synthesize field-level programs based on the input-only examples 502. The search component 504 can synthesize the field-level programs based on the input-only examples 502 utilizing a bottom-up enumerative search to evaluate potential candidate sub-programs in the DSL 132. The bottom-up enumerative search performed by the search component 504 can selectively employ operator-specific rule application function(s) 506 over program sets. The bottom-up enumerative search performed by the search component 504 can further employ a generic rule application function 508.

The predictive program synthesis algorithm can be parametric in various domain-specific properties, which can be provided as configuration parameters for particular domain instantiations (e.g., the DSL 132 can be provided as a configuration parameter). Given the DSL 132 and the input-only examples 502, the search component 504 can perform a systematic search to compute the semantically distinct values that can be generated by field-level programs in the DSL 132 up to a certain size bound. Further, as noted above, the search component 504 can utilize certain operator-specific rule application function(s) 506. The operator-specific rule application function(s) 506 can provide orders of magnitude improvement in complexity (compared to use of the generic rule application function 508) and performance for certain operators in the DSL 132, thereby making the synthesis tractable for the DSL 132. Moreover, the operator-specific rule application function(s) 506 can reduce execution time for synthesizing the program 512, reduce a number of processor cycles to perform such synthesis, and the like.

The synthesis component 130 can further include a rank component 510 configured to rank the field-level programs to select a subset of the field-level programs used to construct the program 512 for splitting the input column of the input data set into multiple columns. The rank component 510 can rank the field-level programs based on an alignment relation between the field-level programs. For instance, a maximal collection of aligned field-level programs can be selected by the rank component 510 as the subset of the field-level programs from which the program 512 is constructed.

The rank component 510 can also employ various heuristics to choose between differing programs (e.g., different sets of field-level programs) that generate the same output. Examples of the heuristics include ranking the programs based on size or complexity (e.g., programs that are smaller or simpler are ranked higher), delimiters included in the programs (e.g., programs that include more commonly used delimiters can be ranked higher), and whether constant string delimiters or contextual delimiters are included in the programs (e.g., programs that involve all occurrences of a character string as a delimiter can be preferred).

After the semantic state space exploration performed by the search component 504, the rank component 510 can perform the ranking to obtain the collection of the field-level programs that can be used by the top-level DSL operator as the program 512. In contrast to conventional program synthesis approaches, the ranking of field-level programs implemented by the rank component 510 is not based solely on the properties of the individual field-level programs, but instead on correspondences that hold between different field-level programs. For instance, due to the absence of any output specification, the ranking criteria utilized by the rank component 510 can be to prefer programs that identify maximal structure in the input data. Accordingly, the rank component 510 can identify a largest collection of field-level extractions that align well with one another for some notion of alignment that is relevant to the data domain.

Below is exemplary pseudocode for a predictive program synthesis algorithm that can be implemented by the synthesis component 130. It is to be appreciated, however, that this exemplary pseudocode is presented for illustration purposes, and the claimed subject matter is not limited to the following exemplary pseudocode.

```
 1:  function PredictiveSynthesis(Ī,C)
 2:      let Ī = (I₁, . . . , Iₘ)
 3:      let C. DSL = (ψ̄_N, ψ̄_T, ψ_start, R)
 4:      let r_t ∈ R be the top rule ψ_start := O_{P_t}(ψ_{f₁}, . . . , ψ_{f_l})
 5:      let M: ψ̄_N ∪ ψ̄_T → P(Σ) map symbols to sets of states
 6:      for each ψ ∈ ψ̄_T do
 7:          M[ψ] ← {((v)ᵐ,v)|v ∈ C. ExtractLiterals(Ī,ψ̄_T)}
 8:      for (iter = 0; iter < C. MaxDepth; iter + +) do
 9:          for each r ∈ R\{r_t} do
10:              let r be ψ_h := O_p(ψ_1, . . . , ψ_n)
11:              if C. LiftFuncs[r] ≠ null then
12:                  σ̃ ← C. LiftFuncs[r](M[ψ_1], . . . , M[ψ_n])
13:              else
14:                  σ̃ ← LiftGeneric(M,r,m)
15:              σ̃_new ← {(v̄,P) ∈ σ̃|¬∃P'. (v̄,P') ∈ M[ψ_h]}
16:              M[ψ_h] ← M[ψ_h] ∪ σ̃_new
17:          ((v̄_1,P_1), . . . , (v̄_k,P_k)) ← C. Rank(M[ψ_f])
18:      return O_{P_t}(P_1, . . . , P_k)
```

In the foregoing algorithm, a parameter Ī holds the m input examples $l_1, \ldots, l_m$ (e.g., the input-only examples 502). For splitting text strings, each input example may be a string in a row of an input data set (e.g., the input data set 104). Further, a parameter C is a configuration parameter that defines various configuration properties for the algorithm. For example, the configuration parameter can define configuration properties such as the DSL 132, the rule application functions (e.g., the operator-specific rule application function(s) 506 and the generic rule application function 508) (LiftFuncs), a bound on a depth of a syntax tree of programs considered (MaxDepth), a function that computes literal values for terminal types from the input data (ExtractLiterals), and a function that selects the field-level programs used to construct the program 512 (Rank). However, the claimed subject matter is not limited to the foregoing example.

Programs can be synthesized in the DSL 132. The top-level rule and the field-level programs symbol $\psi_f$ are determined at line 4. At line 5, a state map M from symbols to a set of states is initialized, which can be used to maintain values generated by different programs on the given input examples. A state $\sigma \in \Sigma$ of type $\psi$ is of the form $(\bar{v}, P)$, representing a tuple of values $\bar{v}=(v_1, \ldots, v_m)$, where each $v_i \in [[\psi]]$ is the value generated on input example $1_i$ by program P of type $\psi$. Moreover, $\sigma$ can denote a set of states, and all states of type $\psi$ can be denoted by $\Sigma(\psi)$. As described below, the algorithm can include three phases, namely, state space initialization, search, and ranking.

The state map is initialized with literal values for each of the terminal symbols of the DSL 132 at lines 6 and 7. The initialization of the state map can be performed using the ExtractLiterals function, which can compute literal values for each terminal type from the input examples. For example, constant string values for s can be determined as any sub strings of the input examples. Alternatively, according to another example, special character strings can be identified in the input examples, where the special character strings are character strings commonly used as delimiters. Moreover, regular expression tokens t that can be considered are standard regular expression patterns for numbers, lower or upper case letters, special characters, date/time, etc. At line 7, the states for each terminal symbol can be initialized with the extracted literal values (where $(v)^m$ represents a value tuple of m occurrences of the same value v, since a literal can have the same value on any input example).

Moreover, the search component 504, as described herein, can synthesize the field-level programs (e.g., utilizing the bottom-up search). At Line 8, the bottom-up exploration of the state space can begin. The search can be bounded by the MaxDepth configuration parameter, which can impose a bound on the depth of the syntax tree of the programs considered by the search component 504. Given the existing set of states at each iteration, for each rule r other than the top-level rule, a set $\sigma_{new}$ representing new distinct values created by the application of the rule over existing values can be computed at line 15. This rule application can be a lifting of the rule operator semantics function [[r]] to sets of states, namely, a function with signature:

$$P(\Sigma(\psi_1)) \times, \ldots, \times p(\Sigma(\psi_n)) \to (\Sigma(\psi_h))$$

The operator-specific rule application function(s) 506 and the generic rule application function 508 can be used by the search component 504 to apply the rules. Below is exemplary pseudocode for the generic rule application function 508 (also referred to herein as a generic lifting function and LiftGeneric). Yet, it is to be appreciated that the claimed subject matter is not limited to the following example.

```
1: function LiftGeneric(M,r,m)
2:    let r be ψ_h := O_p(ψ_1, ..., ψ_n) and let result = ∅
3:    for each ((v̄_1,P_1), ..., (v̄_n,P_n)) ∈ M[ψ_1]× ... × M[ψ_n] do
4:        for k = 1 ... m do
```

-continued

```
5:            v_k ← [[r]](v̄_1[k], ..., v̄_n[k])
6:        result ← result ∪ {((v_1, ..., v_m), O_p(P_1, ..., P_n))}
7: return result
```

The generic rule application function 508 can be used by the search component 504 for applying an arbitrary rule. The generic rule application function 508 can compute the cross product over parameter sets and can apply rule semantics over combinations of value tuples. The generic rule application function 508 is rule agnostic; however, the naïve combinatorial approach of the generic rule application function 508 can be expensive in practice (e.g., in terms of a duration of execution time, processing resources utilized).

Moreover, complexity reduction can be gained by the search component 504 using the operator-specific rule application function(s) 506 for certain kinds of operators. For instance, the LiftFuncs configuration parameter can map certain rule(s) to corresponding operator-specific application function(s) 506. Thus, at line 12 of the predictive program synthesis algorithm, one of the operator-specific rule application function(s) 506 (e.g., one of the lifting functions) can be used if such function exists for a rule being applied; alternatively, at line 14, the generic rule application function 508 is used as a default for a rule being applied if there is not a corresponding operator-specific rule application function.

According to an example, the operator-specific rule application function(s) 506 can include an operator-specific rule application function for the Concat (concatenation) operator and an operator-specific rule application function for the LookAround operator in the DSL 132 for text splitting. For example, for the Concat operator, there can be an existing set of regexes (regular expressions) that match on the input strings; further, it can be desired to find concatenations of the regexes that also match on the input strings. While the naïve approach can be to check all pairs, the operator-specific rule application function for the Concat operator can traverse the set of regex matches and can build a map from end positions to the regexes matching on those end positions. A second linear traversal can then check for regexes that start at these end positions, so that pairs of regexes that actually have adjacent matches on the input strings are considered. A similar technique can be used in the case of the LookAround operator, where triples instead of pairs of matches can be considered.

Moreover, the rank component 510 can be configured to rank the field-level programs, using the Rank function at line 17 of the predictive program synthesis algorithm, to select the subset of the field-level programs used to construct the program 512. The program 512 can be constructed from the selected subset of the field-level programs with the top-level operator at line 18. The rank component 510 can rank the field-level programs based on inter-subprogram correspondence. In contrast to previous ranking approaches that examine properties of individual programs, the rank component 510 can detect maximal structure in the input data by finding a largest collection of field-level extractions that aligned well with one another. The rank component 510 can find such maximal collections of states.

For instance, the correspondence relation used by the rank component 510 can be based on regular disjoint alignment of delimiters across inputs. Formally, states $(\bar{v}_1, P_1)$ and $(\bar{v}_2, P_2)$ satisfy the relation $\bar{v}_1 = (d_1, \ldots, d_m)$, $\bar{v}_2 = (d'_1, \ldots, d'_m)$ and Ordering$(d_1, d'_1)$==Ordering$(d_m, d'_m)$. Each $d_i$ and $d'_i$ is an array of integer pairs Pair<int, int>[ ] determined by delimiter programs $P_1$ and $P_2$ on the ith input example, where each pair can represent a region in the input string that is an occurrence of the delimiter. The Ordering($d_1,d_2$)=l can be defined, where l=null if any delimiter regions in $d_1$ and $d_2$ overlap, and otherwise $l \in \{0,1\}^{|d_1|+|d_2|}$ is a list of binary numbers representing the left to right ordering of the delimiter regions from $d_1$ and $d_2$. For example, Ordering([(1,4)], [(3,7)])=null since the two delimiter regions overlap, while Ordering([(2,3), (7,9)], [(4,6), (13,15)])=(0,1,0,1) as the two delimiters occur disjointly in an alternating fashion.

Figure 6:
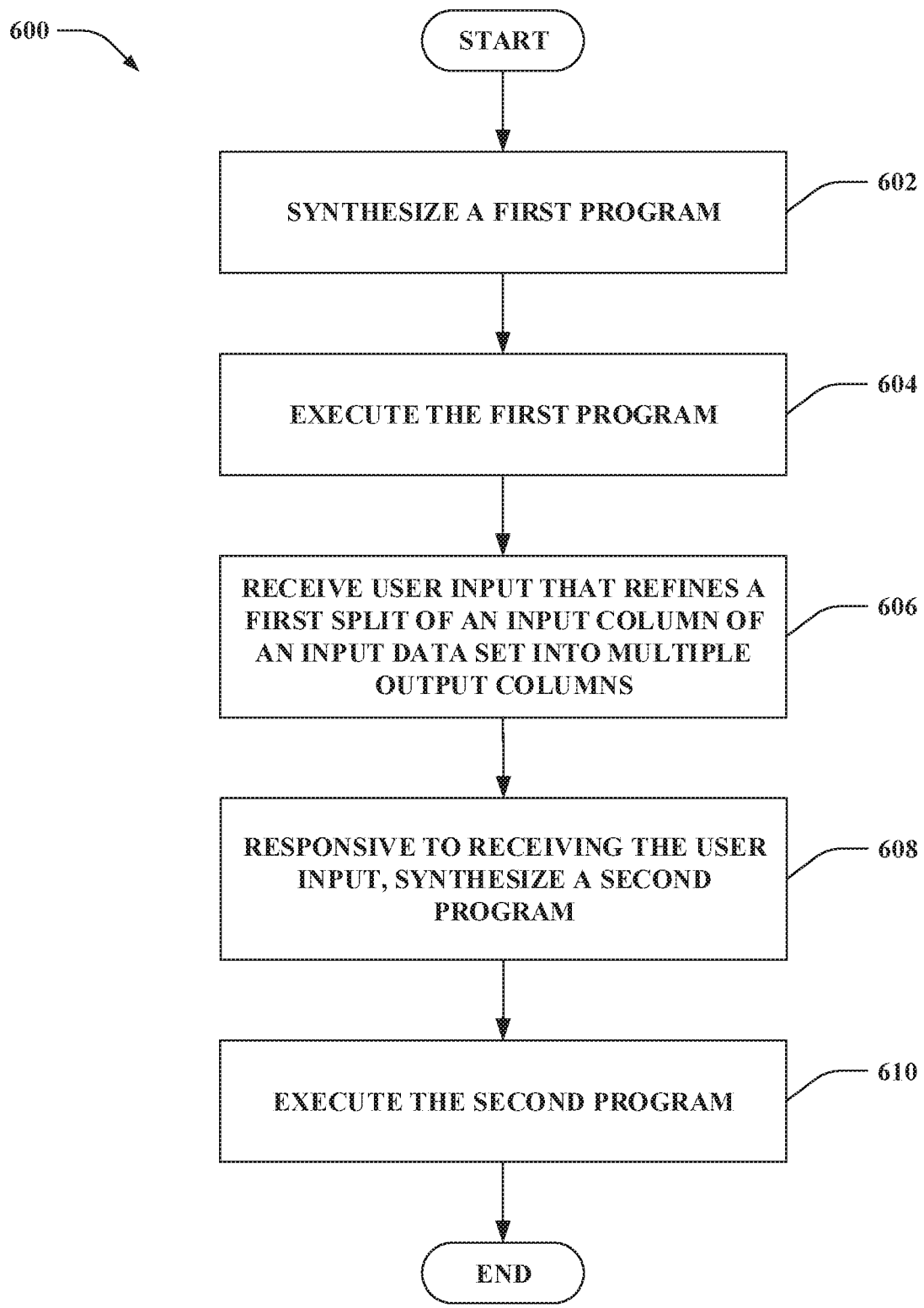
FIG. 6 is a flow diagram that illustrates an exemplary methodology for interactively splitting an input column of an input data set into multiple output columns.
Figure 7:
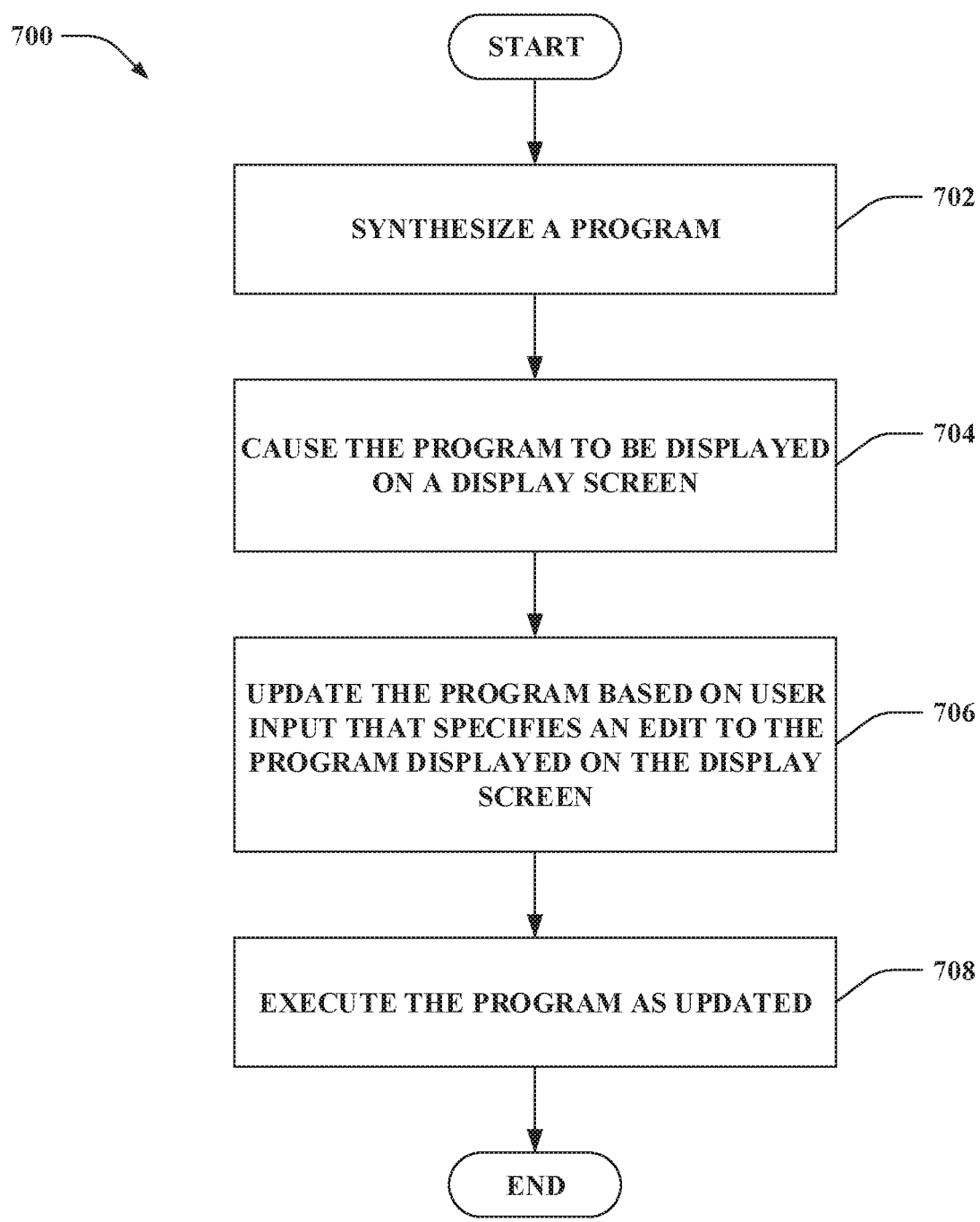
FIG. 7 is a flow diagram that illustrates another exemplary methodology for interactively splitting an input column of an input data set into multiple output columns.
Figure 8:
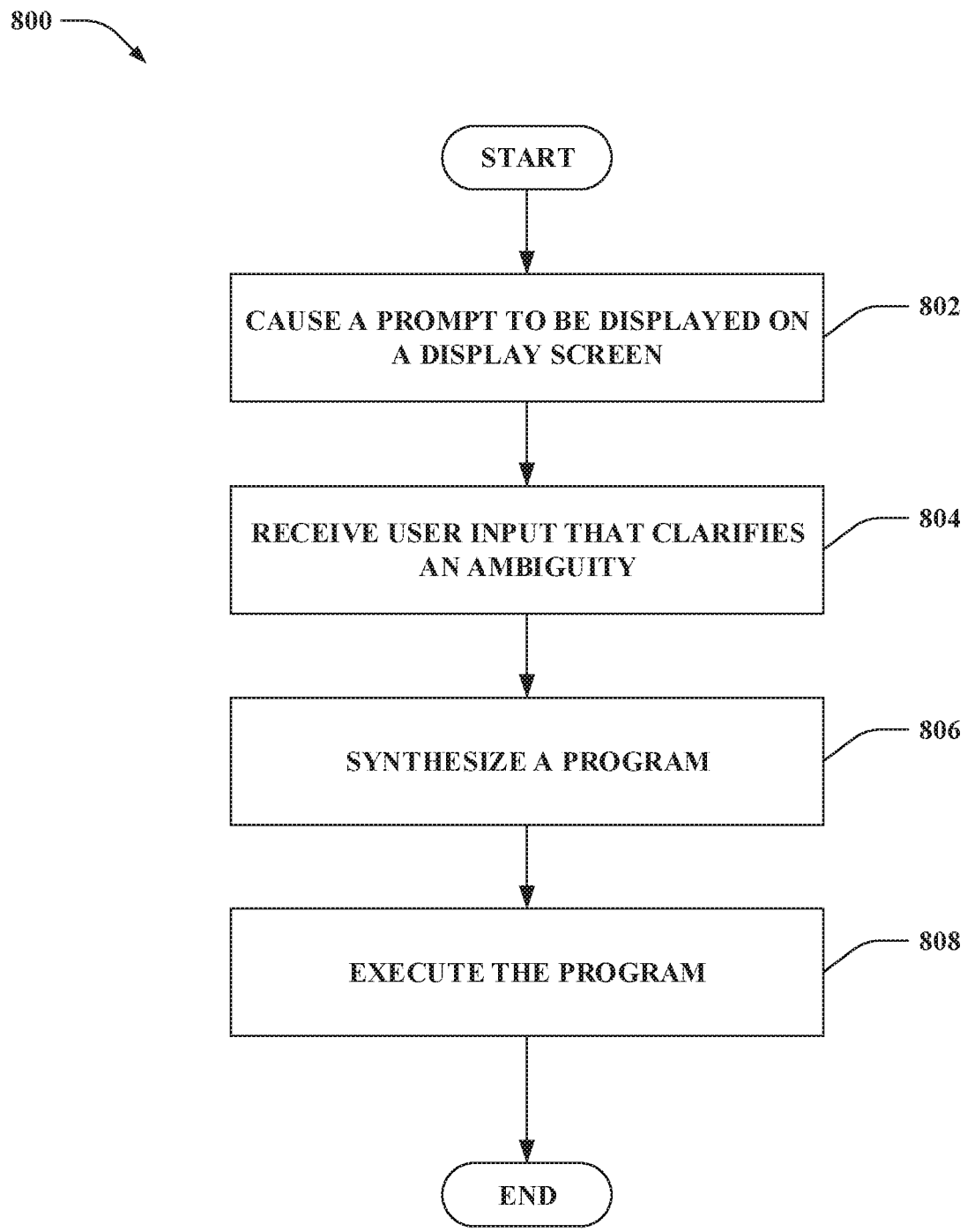
FIG. 8 is a flow diagram that illustrates yet another exemplary methodology for interactively splitting an input column of an input data set into multiple output columns.

FIGS. 6-8 illustrate exemplary methodologies relating to synthesizing and/or executing a program for interactively splitting an input column of an input data set into multiple output columns. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 6 illustrates a methodology 600 for interactively splitting an input column of an input data set into multiple output columns. At 602, a first program for splitting the input column of the input data set into the multiple output columns can be synthesized from input-only examples. The input column of the input data set can include text string entries. At 604, the first program can be executed to output a first split of the input column of the input data set into the multiple output columns. At 606, user input that refines the first split of the input column of the input data set into the multiple output columns can be received. At 608, responsive to receiving the user input, a second program for splitting the input column of the input data set into the multiple output columns can be synthesized based on the user input. At 610, the second program can be executed to output a refined, second split of the input column of the input data set into the multiple output columns.

Referring to FIG. 7, illustrated is another methodology 700 for interactively splitting an input column of an input data set into multiple output columns. At 702, a program for splitting the input column of the input data set into the multiple output columns can be synthesized from input-only examples. The program can be synthesized in a DSL for splitting a text string into a tuple of fields based on a combination of delimiters. At 704, the program can be caused to be displayed on a display screen. The program can be editable when displayed on the display screen. At 706, the program can be updated based on user input that specifies an edit to the program displayed on the display screen. At 708, the program as updated can be executed on the input data set to output a split of the input column of the input data set into the multiple output columns.

With reference to FIG. 8, illustrated is yet another methodology 800 for interactively splitting an input column of an input data set into multiple output columns. At 802, a prompt can be caused to be displayed on a display screen. The prompt specifies an ambiguity regarding splitting the input column of the input data set into the multiple output columns. At 804, user input that clarifies the ambiguity can be received. At 806, a program for splitting the input column of the input data set into the multiple output columns can be synthesized based on the user input. At 808, the program can be executed on the input data set to output a split of the input column of the input data set into the multiple output columns.

Figure 9:
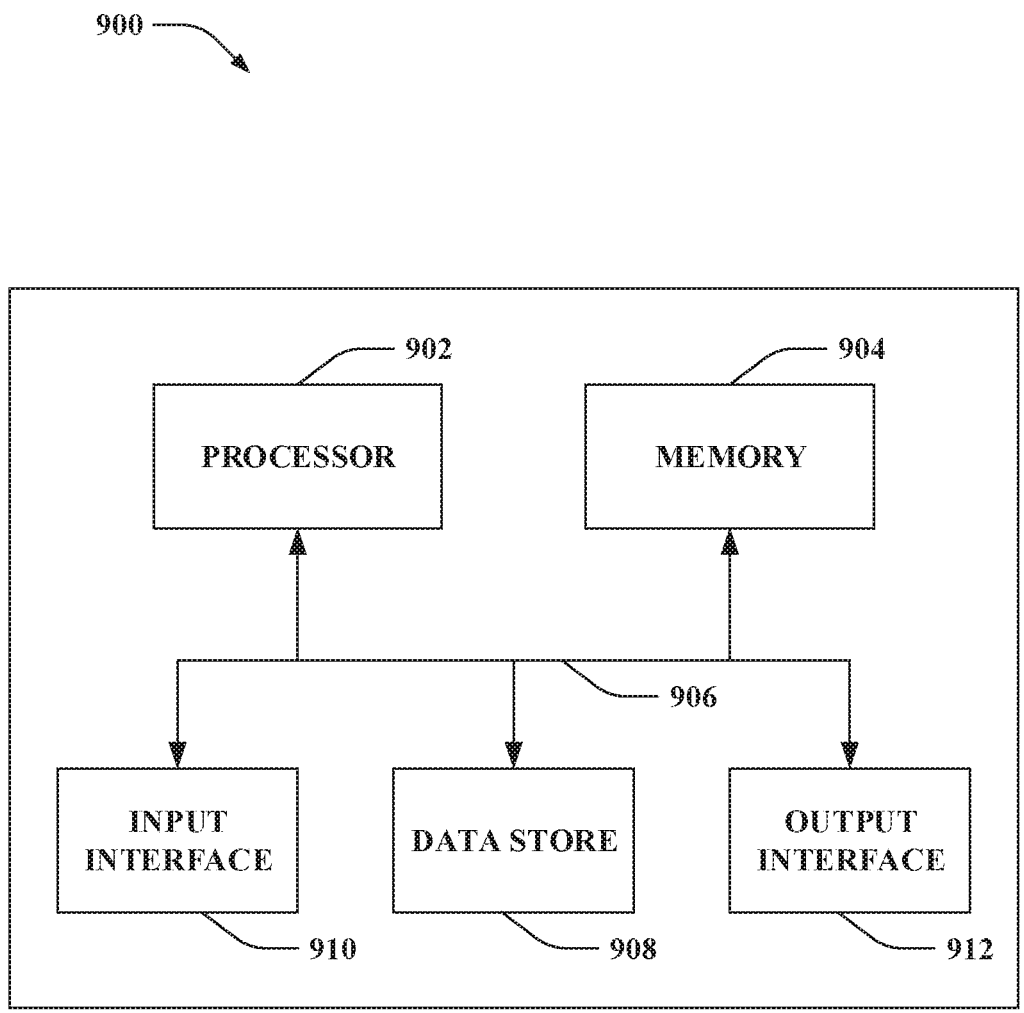
FIG. 9 illustrates an exemplary computing device.

Referring now to FIG. 9, a high-level illustration of an exemplary computing device 900 that can be used in accordance with the systems and methodologies disclosed herein is illustrated. For instance, the computing device 900 may be used in a system that interactively splits a column into multiple columns (e.g., the computing system 102 can be or include the computing device 900). By way of another example, the computing device 900 can be the computing device 118. The computing device 900 includes at least one processor 902 that executes instructions that are stored in a memory 904. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store programs, input-only examples, data set(s) (or portions thereof), and so forth.

The computing device 900 additionally includes a data store 908 that is accessible by the processor 902 by way of the system bus 906. The data store 908 may include executable instructions, programs, input-only examples, data set(s) (or portions thereof), etc. The computing device 900 also includes an input interface 910 that allows external devices to communicate with the computing device 900. For instance, the input interface 910 may be used to receive instructions from an external computer device, from a user, etc. The computing device 900 also includes an output interface 912 that interfaces the computing device 900 with one or more external devices. For example, the computing device 900 may display text, images, etc. by way of the output interface 912.

It is contemplated that the external devices that communicate with the computing device 900 via the input interface 910 and the output interface 912 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 900 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 900 may be a distributed system. Thus, for instance, several devices may be in communication by way of a network connection and may collectively perform tasks described as being performed by the computing device 900.

Figure 10:
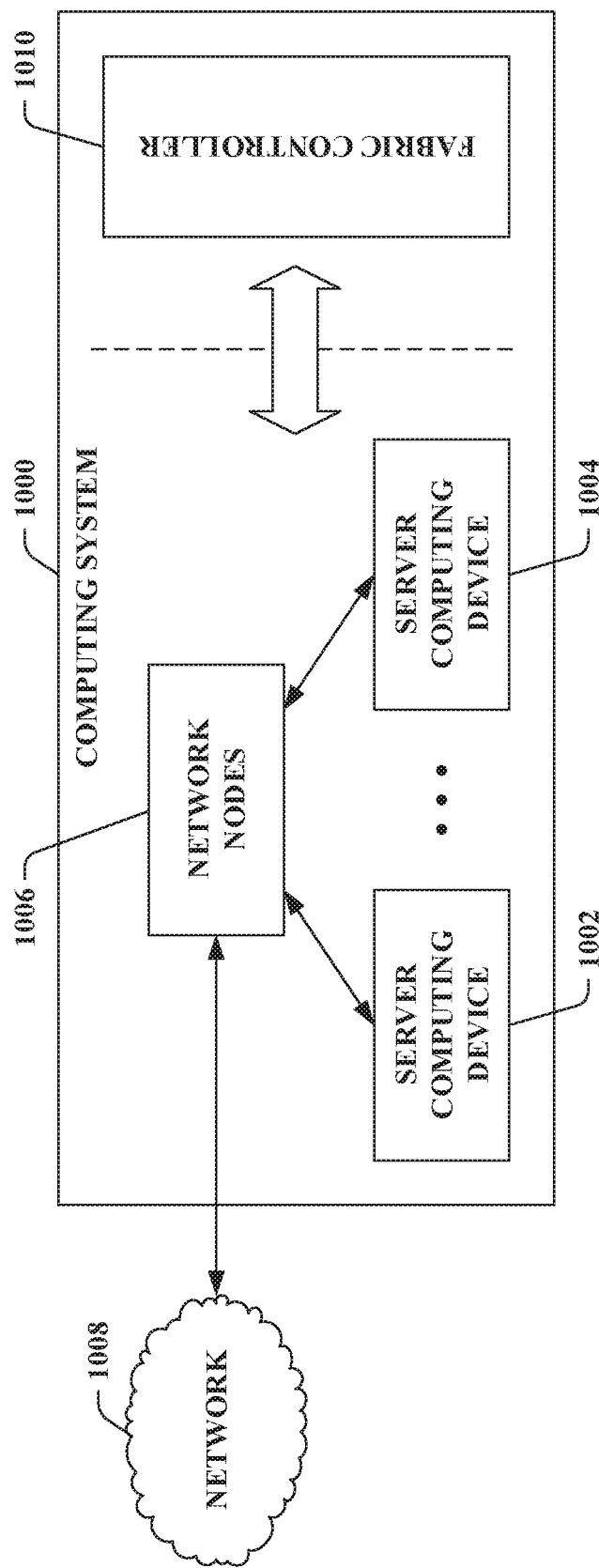
FIG. 10 illustrates an exemplary computing system.

Turning to FIG. 10, a high-level illustration of an exemplary computing system 1000 that can be used in accordance with the systems and methodologies disclosed herein is illustrated. For instance, the computing system 1000 can be or include the computing system 102. Additionally or alternatively, the computing system 102 can be or include the computing system 1000.

The computing system 1000 includes a plurality of server computing devices, namely, a server computing device 1002, . . . , and a server computing device 1004 (collectively referred to as server computing devices 1002-1004). The server computing device 1002 includes at least one processor and a memory; the at least one processor executes instructions that are stored in the memory. The instructions may be, for instance, instructions for implementing functionality described as being carried out by one or more components discussed above or instructions for implementing one or more of the methods described above. Similar to the server computing device 1002, at least a subset of the server computing devices 1002-1004 other than the server computing device 1002 each respectively include at least one processor and a memory. Moreover, at least a subset of the server computing devices 1002-1004 include respective data stores.

Processor(s) of one or more of the server computing devices 1002-1004 can be or include the processor 106. Further, a memory (or memories) of one or more of the server computing devices 1002-1004 can be or include the memory 108. Moreover, a data store (or data stores) of one or more of the server computing devices 1002-1004 can be or include the data repository 114; yet, the claimed subject matter is not so limited as it is to be appreciated that the data repository 114 can be separate from, but in communication with, the computing system 1000.

The computing system 1000 further includes various network nodes 1006 that transport data between the server computing devices 1002-1004. Moreover, the network nodes 1002 transport data from the server computing devices 1002-1004 to external nodes (e.g., external to the computing system 1000) by way of a network 1008. The network nodes 1002 also transport data to the server computing devices 1002-1004 from the external nodes by way of the network 1008. The network 1008, for example, can be the Internet, a cellular network, or the like. The network nodes 1006 include switches, routers, load balancers, and so forth.

A fabric controller 1010 of the computing system 1000 manages hardware resources of the server computing devices 1002-1004 (e.g., processors, memories, data stores, etc. of the server computing devices 1002-1004). The fabric controller 1010 further manages the network nodes 1006. Moreover, the fabric controller 1010 manages creation, provisioning, de-provisioning, and supervising of virtual machines instantiated upon the server computing devices 1002-1004.

Various examples are now set forth.

Example 1

A computing system, comprising: at least one processor; and memory that comprises computer-executable instructions that, when executed by the at least one processor, cause the at least one processor to perform acts including: synthesizing a first program from input-only examples for splitting an input column of an input data set into multiple output columns, the input column of the input data set comprises text string entries; executing the first program to output a first split of the input column of the input data set into the multiple output columns; receiving user input that refines the first split of the input column of the input data set into the multiple output columns; responsive to receiving the user input, synthesizing a second program for splitting the input column of the input data set into the multiple output columns based on the user input; and executing the second program to output a refined, second split of the input column of the input data set into the multiple output columns.

Example 2

The computing system according to Example 1, wherein the first program for splitting the input column of the input data set into the multiple output columns is synthesized based on the input-only examples, the input-only examples comprise example text string entries from the input column of the input data set without specification of how the example text string entries are to be split into the multiple output columns.

Example 3

The computing system according to any of Examples 1-2, wherein the first program and the second program are synthesized in a domain-specific language (DSL) for splitting a text string into a tuple of fields based on a combination of delimiters.

Example 4

The computing system according to any of Examples 1-3, wherein the user input specifies a constraint for refining the first split of the input column of the input data set into the multiple output columns.

Example 5

The computing system according to Example 4, wherein the constraint is a declarative constraint, the declarative constraint indicates a property for the second program across all the text string entries of the input data set.

Example 6

The computing system according to Example 5, wherein the declarative constraint specifies at least one of a number of output columns, a column type of a particular output column, or a set of delimiters.

Example 7

The computing system according to any of Examples 4-6, wherein the constraint is an example-based constraint, the example-based constraint indicates a property for a particular text string entry, the text string entries of the input data set comprise the particular text string entry in the input column.

Example 8

The computing system according to Example 7, wherein the example-based constraint specifies at least one of a substring in the particular text string entry indicated in the user input as being an instance of a delimiter or a substring in the particular text string entry indicated in the user input as being an instance of a field for a specified output column.

Example 9

The computing system according to any of Examples 7-8, wherein the example-based constraint comprises negative feedback for the first program, the negative feedback specifies at least one of a substring in the particular text string entry indicated in the user input as not being an instance of a delimiter or a substring in the particular text string entry indicated in the user input as not being an instance of a field.

Example 10

The computing system according to any of Examples 1-9, wherein the user input specifies a particular output column to be further split.

Example 11

The computing system according to any of Examples 1-10, wherein the user input specifies a contiguous subsequence of the multiple output columns to be merged.

Example 12

The computing system according to any of Examples 1-11, the memory further comprising computer-executable instructions that, when executed by the at least one processor, cause the at least one processor to perform acts including: causing a prompt to be displayed on a display screen, the prompt specifies an ambiguity regarding splitting the input column of the input data set into the multiple output columns, and the prompt solicits the user input that refines the first split of the input column of the input data set into the multiple output columns to clarify the ambiguity.

Example 13

The computing system according to Example 12, wherein the user input specifies at least one of a declarative constraint or an example-based constraint to clarify the ambiguity, the declarative constraint indicates a property for the second program across all the text string entries of the input data set, and the example-based constraint indicates a property for a particular text string entry in the text string entries of the input data set.

Example 14

A method of interactively splitting an input column of an input data set into multiple output columns, comprising: synthesizing a program from input-only examples for splitting the input column of the input data set into the multiple output columns, the program being synthesized in a domain-specific language (DSL) for splitting a text string into a tuple of fields based on a combination of delimiters; causing the program to be displayed on a display screen, the program being editable when displayed on the display screen; updating the program based on user input that specifies an edit to the program displayed on the display screen; and executing the program as updated on the input data set to output a split of the input column of the input data set into the multiple output columns.

Example 15

The method according to Example 14, further comprising: prior to the updating of the program: executing the program on the input data set; and causing a result of the program prior to the updating to be displayed on the display screen with the program.

Example 16

The method according to any of Examples 14-15, wherein the program for splitting the input column of the input data set into the multiple output columns is synthesized based on the input-only examples, the input-only examples comprise example text string entries from the input column of the input data set without specification of how the example text string entries are to be split into the multiple output columns.

Example 17

The method according to any of Examples 14-16, further comprising: receiving user input that specifies at least one of a declarative constraint or an example-based constraint, the declarative constraint indicates a property for the program across all text string entries of the input data set, and the example-based constraint indicates a property for a particular text string entry in the text string entries of the input data set; wherein the program for splitting the input column of the input data set into the multiple output columns is synthesized based on the user input.

Example 18

A method of interactively splitting an input column of an input data set into multiple output columns, comprising: causing a prompt to be displayed on a display screen, the prompt specifies an ambiguity regarding splitting the input column of the input data set into the multiple output columns; receiving user input that clarifies the ambiguity; synthesizing a program for splitting the input column of the input data set into the multiple output columns based on the user input; and executing the program on the input data set to output a split of the input column of the input data set into the multiple output columns.

Example 19

The method according to Example 18, wherein the user input specifies at least one of a declarative constraint or an example-based constraint to clarify the ambiguity, the declarative constraint indicates a property for the program across all text string entries of the input data set, and the example-based constraint indicates a property for a particular text string entry in the text string entries of the input data set.

Example 20

The method according to any of Examples 18-19, wherein the program is synthesized in a domain-specific language (DSL) for splitting a text string into a tuple of fields based on a combination of delimiters.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing system, comprising:
   at least one processor; and
   memory that comprises computer-executable instructions that, when executed by the at least one processor, cause the at least one processor to perform acts including:
   synthesizing a first program based on input-only examples for splitting an input column of an input data set into multiple output columns, the input column of the input data set comprises text string entries, the input-only examples comprise example text string entries from the input column of the input data set without specification of how the example text string entries are to be split into the multiple output columns;
   executing the first program to output a first split of the input column of the input data set into the multiple output columns, the first program being executed on the text string entries of the input column of the input data set;
   causing a prompt to be displayed on a display screen, the prompt specifies an ambiguity regarding how to split the input column of the input data set into the multiple output columns when the first program is executed on the text string entries of the input column, and the prompt solicits user input that refines the first split of the input column of the input data set into the multiple output columns to clarify the ambiguity;
   receiving the user input that refines the first split of the input column of the input data set into the multiple output columns;
   responsive to receiving the user input, synthesizing a second program for splitting the input column of the input data set into the multiple output columns based on the user input; and
   executing the second program to output a refined, second split of the input column of the input data set into the multiple output columns.

2. The computing system of claim 1, wherein the first program and the second program are synthesized in a domain-specific language (DSL) for splitting a text string into a tuple of fields based on a combination of delimiters.

3. The computing system of claim 1, wherein the user input specifies a constraint for refining the first split of the input column of the input data set into the multiple output columns.

4. The computing system of claim 3, wherein the constraint is a declarative constraint, the declarative constraint indicates a user specified property for splitting the text string entries applicable across all the text string entries of the input data set.

5. The computing system of claim 4, wherein the declarative constraint specifies at least one of a number of output columns, a column type of a particular output column, or a set of delimiters.

6. The computing system of claim 3, wherein the constraint is an example-based constraint, the example-based constraint indicates a user specified property for splitting a particular text string entry, the text string entries of the input data set comprise the particular text string entry in the input column.

7. The computing system of claim 6, wherein the example-based constraint specifies at least one of a substring in the particular text string entry indicated in the user input as being an instance of a delimiter or a substring in the particular text string entry indicated in the user input as being an instance of a field for a specified output column.

8. The computing system of claim 6, wherein the example-based constraint comprises negative feedback for the first program, the negative feedback specifies at least one of a substring in the particular text string entry indicated in the user input as not being an instance of a delimiter or a substring in the particular text string entry indicated in the user input as not being an instance of a field.

9. The computing system of claim 1, wherein the user input specifies a particular output column to be further split.

10. The computing system of claim 1, wherein the user input specifies a contiguous subsequence of the multiple output columns to be merged.

11. The computing system of claim 1, wherein the user input specifies at least one of a declarative constraint or an example-based constraint to clarify the ambiguity, the declarative constraint indicates a property for the second program across all the text string entries of the input data set, and the example-based constraint indicates a property for a particular text string entry in the text string entries of the input data set.

12. The computing system of claim 1, wherein synthesizing the first program based on the input-only examples for splitting the input column of the input data set into the multiple output columns further comprises:
identifying potential field-level programs based on the input-only examples, wherein a given field-level program is configured to detect a given delimiter between data values; and
ranking sets of the potential field-level programs to select a particular set of the potential field-level programs, wherein the first program is constructed from the particular set of the potential field-level programs.

13. The computing system of claim 1, wherein the example text string entries of the input-only examples upon which the first program is synthesized are sampled from the text string entries of the input column of the input data set.

14. A method of interactively splitting an input column of an input data set into multiple output columns, comprising:
synthesizing a program based on input-only examples for splitting the input column of the input data set into the multiple output columns, the program being synthesized in a domain-specific language (DSL) for splitting a text string into a tuple of fields based on a combination of delimiters, the input-only examples comprise example text string entries from the input column of the input data set without specification of how the example text string entries are to be split into the multiple output columns, the example text string entries of the input-only examples upon which the program is synthesized being sampled from the input column of the input data set;
causing the program to be displayed on a display screen, the program being editable when displayed on the display screen;
causing a prompt to be displayed on the display screen, the prompt specifies an ambiguity regarding how to split the input column of the input data set into the multiple output columns when employing the program synthesized based on the input-only examples without specification of how the example text string entries are to be split, wherein the prompt solicits user input to clarify the ambiguity;
updating the program based on the user input that specifies an edit to the program displayed on the display screen; and
executing the program as updated on the input data set to output a split of the input column of the input data set into the multiple output columns.

15. The method of claim 14, further comprising:
prior to the updating of the program:
executing the program on the input data set; and
causing a result of the program prior to the updating to be displayed on the display screen with the program.

16. The method of claim 14, further comprising:
receiving user input, the user input specifies a declarative constraint, the declarative constraint indicates a user specified property for splitting text string entries of the input data set applicable across all the text string entries of the input data set;
wherein the program for splitting the input column of the input data set into the multiple output columns is synthesized based on the user input.

17. A method of interactively splitting an input column of an input data set into multiple output columns, comprising:
causing a prompt to be displayed on a display screen, the prompt specifies an ambiguity regarding how to split the input column of the input data set into the multiple output columns when executing a first program for splitting the input column of the input data set into the multiple output columns, wherein the prompt solicits user input that clarifies the ambiguity, wherein the user input specifies at least one of a declarative constraint or an example-based constraint to clarify the ambiguity, wherein the declarative constraint indicates a user specified property for splitting text string entries of the input data set applicable across all the text string entries of the input data set, and wherein the example-based constraint indicates a user specified property for splitting a particular text string entry in the text string entries of the input data set;
receiving the user input that clarifies the ambiguity;
synthesizing a second program for splitting the input column of the input data set into the multiple output columns based on the user input; and
executing the second program on the input data set to output a split of the input column of the input data set into the multiple output columns.

18. The method of claim 17, wherein the second program is synthesized in a domain-specific language (DSL) for splitting a text string into a tuple of fields based on a combination of delimiters.

19. The method of claim 14, further comprising:
receiving user input, the user input specifies an example-based constraint, the example-based constraint indicates a user specified property for a splitting particular text string entry in the text string entries of the input data set;
wherein the program for splitting the input column of the input data set into the multiple output columns is synthesized based on the user input.

20. The method of claim 17, further comprising:
synthesizing the first program for splitting the input column of the input data set into the multiple output columns.

* * * * *